United States Patent [19]

Aiello et al.

[11] Patent Number: 5,608,801
[45] Date of Patent: Mar. 4, 1997

[54] EFFICIENT CRYPTOGRAPHIC HASH FUNCTIONS AND METHODS FOR AMPLIFYING THE SECURITY OF HASH FUNCTIONS AND PSEUDO-RANDOM FUNCTIONS

[75] Inventors: William A. Aiello, Madison; Ramarathnam Venkatesan, Morristown, both of N.J.

[73] Assignee: Bell Communications Research, Inc., Morristown, N.J.

[21] Appl. No.: 559,213

[22] Filed: Nov. 16, 1995

[51] Int. Cl.⁶ .............................. H04L 9/00; G06F 1/02; H03B 29/00
[52] U.S. Cl. ........................ 380/46; 331/78; 364/717; 380/28; 380/29; 380/30; 380/44; 380/47; 380/49
[58] Field of Search .................................. 380/9, 21, 28, 380/29, 44, 46, 49, 59, 30, 47, 50; 331/78; 364/717

[56] References Cited

U.S. PATENT DOCUMENTS

| | | | |
|---|---|---|---|
| 4,817,145 | 3/1989 | Günther | 380/47 |
| 4,944,009 | 7/1990 | Micali et al. | 380/46 |
| 5,005,200 | 4/1991 | Fischer | 380/30 |
| 5,224,165 | 6/1993 | Reinhardt et al. | 380/47 |
| 5,432,852 | 7/1995 | Leighton et al. | 380/30 |

OTHER PUBLICATIONS

Data Encryption Standard (DES), as published by the National Bureau of Standards, Department of Commerce, FIPS, pub 46, Jan. 1977.
A. C. Yao, "Theory and Applications of Trapdoor Functions," Proc. of IEEE Symp. on Foundations of Computer Science (1982), pp. 80–91.
M. Blum, and S. Micali, "How to Generate Cryptographically Strong Sequences of Pseudo–Random Bits," SIAM Journal of Computing, {13} (1984) 850–864.
R. Rivest, "The MD4 Message Digest Algorithm," Advances in Cryptology, Proc. of Crypto 90, Lecture Notes in Computer Science 537, Springer Verlag 1991, 303–311.
"The MD5 Message Digest Algorithm," Request for Comments, 1321, Internet Activities Board, Internet Privacy Task Force, Apr. 1992.

*Primary Examiner*—Bernarr E. Gregory
*Attorney, Agent, or Firm*—Joseph Giordano

[57] ABSTRACT

Methods and circuitry for generating a cryptographic hash function using a strong pseudo-random generator along with the input data to create high quality pseudo-random keys as indices to pseudo-random functions, as well as a pseudo-random function from 2n bits to 2n bits given a pseudo-random function from n bits to n bits.

13 Claims, 5 Drawing Sheets

EFFICIENT CRYPTOGRAPHIC HASH FUNCTIONS AND METHODS FOR AMPLIFYING THE SECURITY OF HASH FUNCTIONS AND PSEUDO-RANDOM FUNCTIONS

FIELD OF THE INVENTION

This invention relates generally to hash function generators and, more specifically, to circuitry and a concomitant methodology for the efficient generation of cryptographic hash function bits.

BACKGROUND OF THE INVENTION

A cryptographic hash function (CHF) is a basic cryptographic primitive and as such it has been widely investigated. Informally, a hash function is any function which takes as input a long string of bits and returns a short, fairly random string of bits. Basically, a cryptographic hash function is a hash function with the additional property that finding two input strings which map to the same output string is computationally infeasible. There are actually several variations in the definition of a CHF—the distinctions among the variations will be discussed shortly.

Cryptographic hash functions have a wide variety of applications. For motivational purposes, several applications are briefly outlined. These applications of cryptographic hash functions are not exhaustive—they are simply meant to be illustrative of their broad cryptographic utility. Cryptographic hash functions are used for virus protection and data security. That is, rather than storing an entire program or an entire data set securely, one need only store the cryptographic hash of the program or the data set securely. Before using the program or data set, one first computes the hash value and checks it with the securely stored hash value. In this way, any change to the data or the program will be detected. Also, cryptographic hash functions are used in a similar manner to implement tamper-proof digital time-stamps.

In addition, cryptographic hash functions can be used to implement unforgeable digital signatures. Such a digital signature is quite complicated, however, compared to digital signatures based on public-key cryptosystems. Unfortunately, public-key digital signatures require an inordinate amount of time to compute for large documents. An efficient and simple digital signature scheme is achieved by combining cryptographic hashing with the public-key cryptosystem: a cryptographic hash value of a large document is first computed, and that is subsequently signed using the public-key scheme.

Another use of hash functions can be seen in the following example. Suppose parties $\hat{A}$ and $\hat{B}$ share a secret $\hat{s}$ and $\hat{A}$ wishes to authenticate itself to $\hat{B}$. $\hat{B}$ can send a challenge $\hat{c}$ to $\hat{A}$ in the clear. $\hat{A}$ computes the cryptographic hash value of $(\hat{c},\hat{s})$ and sends it to $\hat{B}$. $\hat{B}$ accepts the authenticity of $\hat{A}$ if the value it receives is the same as the cryptographic hash value of $(\hat{c},\hat{s})$ that it privately computed.

Thus far the distinctions between several types of CHFs have been ignored. The two most important variants are now described. The first is called a Universal One-way Hash Function. Such a hash function is indexed by a key. The key is chosen uniformly and independently of the input string. Given the input and the key (and, thus, the hash value), finding another input with the same hash value is infeasible with very high probability. Universal Hash Functions are known to exist if One Way Functions (i.e., functions which are easy to compute but infeasible to invert) exist.

The second variant is called a One-Way Hash Function (OWHF). A OWHF may or may not be indexed by a key. For a OWHF, finding two inputs (and the key if it is a keyed function) which hash to the same value is computationally infeasible. Note that OWHFs resist stronger attacks than UHFs. This makes them both more useful and more difficult to design. Indeed, currently it is not known whether One Way Functions are sufficient to design OWHFs.

The art is devoid of teachings or suggestions wherein a OWHF: (1) uses a strong pseudo-random generator; (2) uses input data to create high quality, pseudo-random keys as indicies to pseudo-random functions; and (3) generates a pseudo-random function from 2n bits to 2n bits given a pseudo-random function from n bits to n bits.

SUMMARY OF THE INVENTION

These shortcomings as well as other deficiencies and limitations in the art are obviated, in accordance with the present invention, in which the One-Way Hash Function generator, in contrast to the prior art: (1) uses a strong pseudo-random generator—only recently have strong pseudo-random generators become efficient enough to be practical for use in the design of a OWHF; and (2) generates a pseudo-random function from 2n bits to 2n bits given a pseudo-random function from n bits to n bits. To compute pseudo-random function keys from input data, one may use any universal hash function which (a) has output length larger than the input length by enough margin to rule out two inputs having the same hash value with a good probability (over the choice of hash function parameters) and (b) has the property that given an input and its hash value, the hash value of another input remains largely unpredictable. Herein is provided an efficient universal hash function which is called the Finite Field Subset Sum (FFSS) hashing. Both FFSS hashing and the pseudo-random function construction are of separate and independent interest and have applications beyond their use in the OWHF scheme. For example, the PRF doubling construction has immediate application to increasing the difficulty of attacking existing hash functions like MD5, SHA, or pseudo-random functions like DES using birthday attacks or their generalizations. For example, doubling the output length of MD5 using the construction of the present random invention from 128 bits to 256 bits increases the number of steps needed for a birthday attack from $2^{64}$ to $2^{128}$, as long as MD5 is sufficiently pseudo-random.

Broadly, in accordance with the present invention, output bits corresponding to a one-way hash function of input bits are iteratively generated. Upon each iteration, a current hash function is produced. The methodology utilizes a butterfly pseudo-random function generator, operative with a set of keys, and a finite field subset-sum generator arrangement. For each iteration, the following steps are effected: the input bits are partitioned into a new set of blocks and the new set of blocks are processed by the finite field subset-sum generator arrangement to produce a new set of keys. The new set of keys are provided to the butterfly generator. Then, pseudo-random bits are generated. The exclusive-OR of the pseudo-random bits and the fed-back output of the butterfly generator is computed to produce a set of exclusively-ORed bits. The set of exclusively-ORed bits serve as the next input to be butterfly generator, so that the output of the butterfly generator having the set of exclusively-ORed bits as input is the current one-way hash function. Moreover, the output of the butterfly generator after all the input bits have been partitioned is the one-way hash function.

The security of the inventive subject matter is linked to the security of any trusted block cypher. In spite of the fact that the underlying block cypher has a fixed output size, e.g, 64 bits, the output size of the arrangement in accordance with the present invention is nominally 128 bits. This can be increased to 256 bits or more. Moreover, the scheme can withstand "birthday attacks" consistent with the output strings being uniformly random (e.g., collisions will be found after approximately $2^{64}$ evaluations when the output is 128 bits and after approximately $2^{128}$ evaluations when the output is 256 bits, etc.), as long as the underlying block cypher behaves as a sufficiently secure pseudo-random function. In addition to being robust against birthday attacks and its more powerful generalizations, the technique is also immune to differential cryptanalysis and linear cryptanalysis, the only other known general purpose attacks on hash functions.

The organization and operation of this invention will be understood from a consideration of the detailed description of the illustrative embodiment, which follows, when taken in conjunction with the accompanying drawing.

DETAILED DESCRIPTION

Function Theoretic Basis

Figure 1:
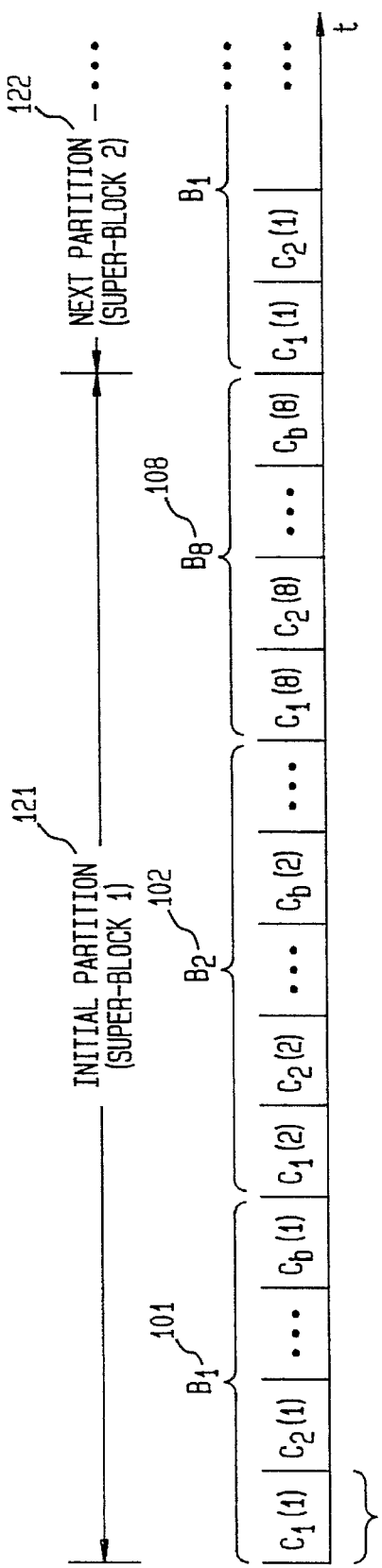
FIG. 1 depicts an input stream of bits partitioned into blocks and super-blocks.

A mathematical description of the building block components of the technique is presented in this section to introduce terminology and basic concepts. Illustrative implementations and extensions to the underlying building block components are discussed in subsequent sections.

It is assumed from the outset that a block cypher from n bits to n bits is an initial given. Such a block cypher encoder may be realized via the Data Encryption Standard (DES), as published by the National Bureau of Standards, Department of Commerce, FIPS, pub 46, January, 1977. DES has a reasonably fast implementation and is commercially available; for example, device type VM009 available from the VLSI Technology Inc. of Tempe, Ariz. implements DES. A block cypher encoder takes as input a random key k and an input string x of size X to produce an output string of size X.

It is also assumed that a cryptographically strong pseudo-random generator (PRG) is a given; such a generator produces a sequence of pseudo-random bits. The cryptographically secure PRG is used to fill tables in a preprocessing step, as will be elucidated in detail below. Furthermore, the PRG will also be accessible during the processing whenever pseudo-random bits are needed during the computation of the OWHF. Generally, a key is used as a seed to the PRG. Thus, members of the instant OW hash function family are indexed by a key. Accordingly, all of the OWHF implementations below are thus parameterized by this seed, but for the sake of notational simplicity this parameter will remain implicit.

It is assumed that the incoming data, expressed in bits, is broken into blocks. For illustrative purposes, reference is made to FIG. 1, wherein block $\beta_1$ (reference numeral 101) is shown as being composed of b groupings designated $\{c_1(1), c_2(1), \ldots, c_b(1)\}$. Similarly, block $\beta_2$ (reference numeral 102) is shown as being composed of b groupings designated $\{c_1(2), c_2(2), \ldots, c_b(2)\}$. As further depicted by illustrative group $c_1(1)$ (reference numeral 111), each group is composed of m bits; for group $c_1(1)$, the m bits are shown illustratively as $\{0,1,1,0,\ldots,0,1\}$. Also it is assumed that the input data bit stream is padded so that it can be broken into blocks as needed. For instance, with reference to FIG. 2, block $\beta_8$ (reference numeral 201) is shown as having the last three groups $c_{b-2}(8)$, $c_{b-1}(8)$, and $c_b(8)$ padded with zeros ("0"), that is, all m bits are zero for the group (see, for example, reference numeral 202).

Again with reference to FIG. 1, the initial portion of the input data bit stream is shown as being partitioned into eight blocks $\beta_1, \beta_2, \ldots, \beta_8$ called the initial partition (reference numeral 121). Another partition of the input bit stream can be effected on the next incoming bits to yield a second partition; this next partition is also composed of eight blocks (again called without loss of generality). The next incoming bits following this second partition can be subdivided into eight blocks to yield yet another next partition in terms of a time sequence. Thus the partitions—eight blocks at a time—form a sequence of partitions having an initial partition, followed by a next partition, then followed by yet another next partition, and so forth until the hash input is exhausted. Groupings of eight blocks are referred to as "super-blocks" in the sequel, and the utility of super-blocks will be explained in detail then. It follows, for example, that the first super-block is composed of blocks $\beta_1, \beta_2, \ldots, \beta_8$ of the initial partition 121. The hash input is composed of the input data concatenated by some standard padding which makes the hash input length an integral multiple of the length of a super-block. For example, the input data can be concatenated with the input data length and the requisite additional blank symbols.

With this introductory nomenclature defined, two basic building block components can be readily described.

Butterfly Pseudo-Random Function:

A butterfly pseudo-random function (B-PRF) is pseudo-random function (PRF) from 2n bits to 2n bits with key K. The B-PRF is implemented illustratively from eight PRF's from n bits to n bits wherein K is the concatenation of eight keys each of length k. The B-PRF is denoted $B_K$.

Finite Field Subset-sum (FFSS) Hashing:

FFSS hashing is a hash function that randomly maps a block of data $\beta$ (such as $\beta_i$, i=1, 2, ..., or 8 of FIG. 1) into a key of length k bits. The FFSS hashing is denoted $S(\beta)$, so $k=S(\beta)$.

To generate the OWHF, the following sequence of steps is carried out. The first step in generating the OWHF h takes the initial eight blocks of data $\beta_1, \beta_2, \ldots, \beta_8$ (reference numerals 101–108 of FIG. 1) to 2n bits as follows. First, eight keys are computed by applying $S(\beta)$ to each block. The results are concatenated to produce the key K for $B_K$. Next a random input u of 2n bits for $B_K$ is supplied by the given PRG. The initial hash value is then simply $B_K(u)$. Symbolically, $$K = S(\beta_1) \cdot S(\beta_2) \cdot S(\beta_3) \cdot S(\beta_4) \cdot S(\beta_5) \cdot S(\beta_6) \cdot S(\beta_7) \cdot S(\beta_8), \quad (1)$$

and $$u \leftarrow PRG(.), \ u \in \{(0,1)\}^{2n}, \quad (2)$$

and finally $$h = B_K(u). \quad (3)$$

Computing the hash value for the first two super-blocks is done as follows. After computing h from the first super-block as above, apply the FFSS hash to the second super-block of the data to generate a second key, K'. Use the given PRG to generate a second 2n-bit output u' from the PRG. Now the hash value for the first and second super-blocks is $$h' = B_{K'}(h u \oplus'). \quad (4)$$

where $\oplus$ stands for bitwise exclusive-OR. In general, if h is the value of the hash function of the first (i–1) super-blocks, then the value of the hash function of the first i super-blocks is given by the formula in equation (4), where K' is the key generated by applying FFSS hashing to the $i^{th}$ super-block and u' is the $i^{th}$ 2n bit output of the given PRG.

Details of FFSS Hashing

Initialization:

Let $T_i$, $i=1, 2, \ldots, b$ be a binary table of size $2^m$ rows and k columns. Then, for $i=1, 2, \ldots, b$, each table $T_i$ is filled with pseudo-random bits in a pre-processing step, that is, $$\text{for } i=1,2,\ldots,b, \ T_i \leftarrow PRG(.). \quad (5)$$

Figure 2:
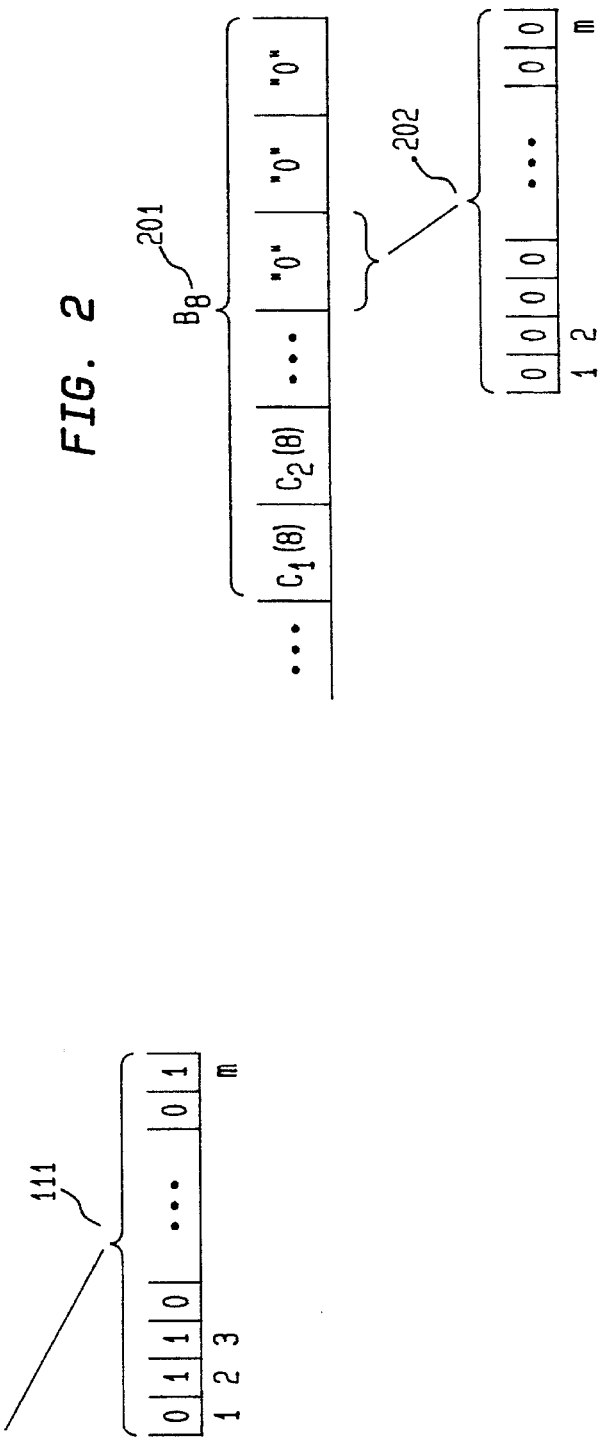
FIG. 2 depicts padding at the end of the input bit stream.

FFSS-hashing:

Let a block of data be denoted generically by $\beta_j = c_1(j), c_2(j), \ldots, c_b(j)$ (see, for example, $\beta_1$ (reference numeral 101) in FIG. 1). Let $T_i[n]$ be the n-th row of the matrix $T_i$. Now the hash function $S(\beta_j)$ corresponding to key $k_j$ is given by:

$$S(\beta_j) = \oplus T_i[c_i(j)] \quad (6)$$

where $\oplus$ stands for bitwise exclusive-OR with i ranging over $1, 2, \ldots, b$.

Circuitry 300 is an illustrative embodiment of FFSS hashing. Tables 301, 302, . . . , 303 are filled in a pre-processing step using a cryptographically strong PRG. Each table $T_i$ has $2^m$ rows and k columns. For the preferred embodiment, m=8 (i.e., there are 256 rows) and k=768 columns. To generate for a given super-block of eight blocks, each key $k_j$, j=1, 2, . . . , 8 corresponding to each of the blocks in the super-block is produced as follows: (1) the bits corresponding to group $c_1(j)$, on bus 311, are used to select a row from the first table 301, and the k bits in the table located in this row are output via bus 321 and serve as one input to exclusive-OR gate 331; (2) the bits corresponding to group $c_2(j)$, on bus 312, are used to select a row from the second table 302, and the k bits in the table located in this row are output via bus 322 and serve as another input to exclusive-OR gate 331; and so forth until (3) the bits corresponding to group $c_b(j)$, on bus 313, are used to select a row from the b-th table 303, and the k bits in the table located in this row are output via bus 323 and serve as another input to exclusive-OR gate 331. The output of the gate 331, on bus 351, is $k_j$. The key K is then the concatenation of the eight $k_j$'s as expressed by equation (1).

Details of the Butterfly Pseudo-Random Function

Figure 4:
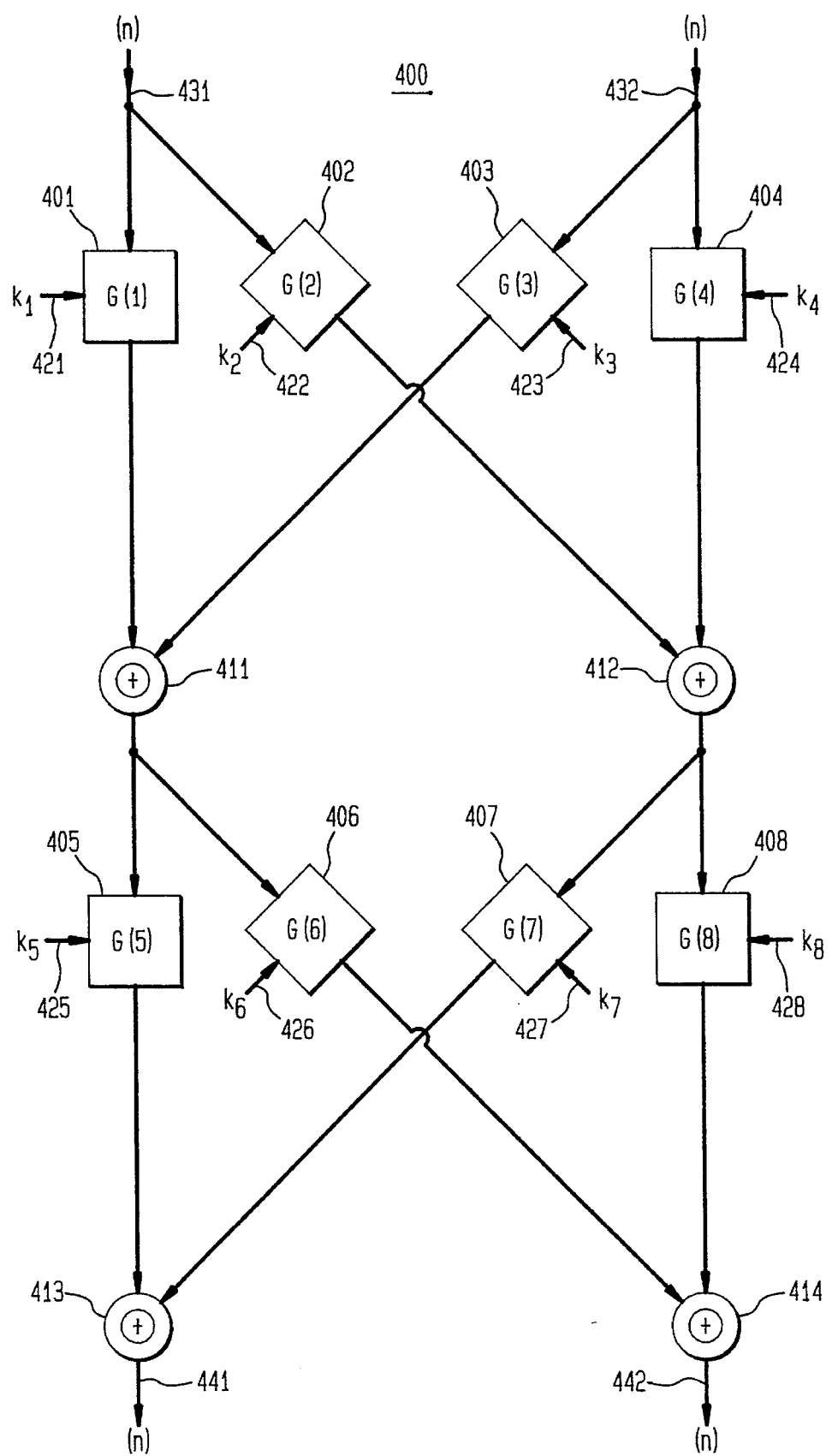
FIG. 4 is illustrative circuitry for the butterfly pseudo-random generator in accordance with the present invention.

To describe the butterfly-PRG, that is, the function $B_K$, reference is made to circuitry 400 of FIG. 4. Circuitry 400 utilizes eight pseudo-random function generators G(1), G(2), . . . , G(8) (reference numerals 401, 402, . . . , 408, respectively), as follows. Initially, eight keys $k_j$, j=1,2, . . . ,8 (reference numerals 421, 422, . . . , 428, respectively) are produced by FFSS hashing for a given superblock. The eight keys serve as keys to the pseudo-random functions G(1), G(2), . . . , G(8), respectively. In addition, 2n random input bits, partitioned into a first and second sets of n bits, serve as inputs to circuitry 400 via buses 431 and 432, respectively. In terms of foregoing description, the 2n bits are generated from the PRG as per equation (2). The first input set is fed to the generators G(1) and G(2), and the second input set is fed to the generators G(3) and G(4). A first intermediate set of n bits are generated in exclusive-OR gate 411 from the outputs of the generators G(1) and G(3), and a second intermediate set of n bits are generated in exclusive-OR gate 412 from the outputs of the generators G(2) and G(4). The first intermediate set is then fed to the generators G(5) and G(6), and the second intermediate set is then fed to the generators G(7) and G(8). The first n output bits for the given super-block are generated in the exclusive-OR gate 413 from the outputs of the generators G(5) and G(7) and appear on bus 441, and the second n output bits for the given super-block are generated in the exclusive-OR gate 414 from the outputs of the generators G(6) and G(S) and appear on bus 442.

Combining FFSS Hashing and Butterfly Function

Figure 3:
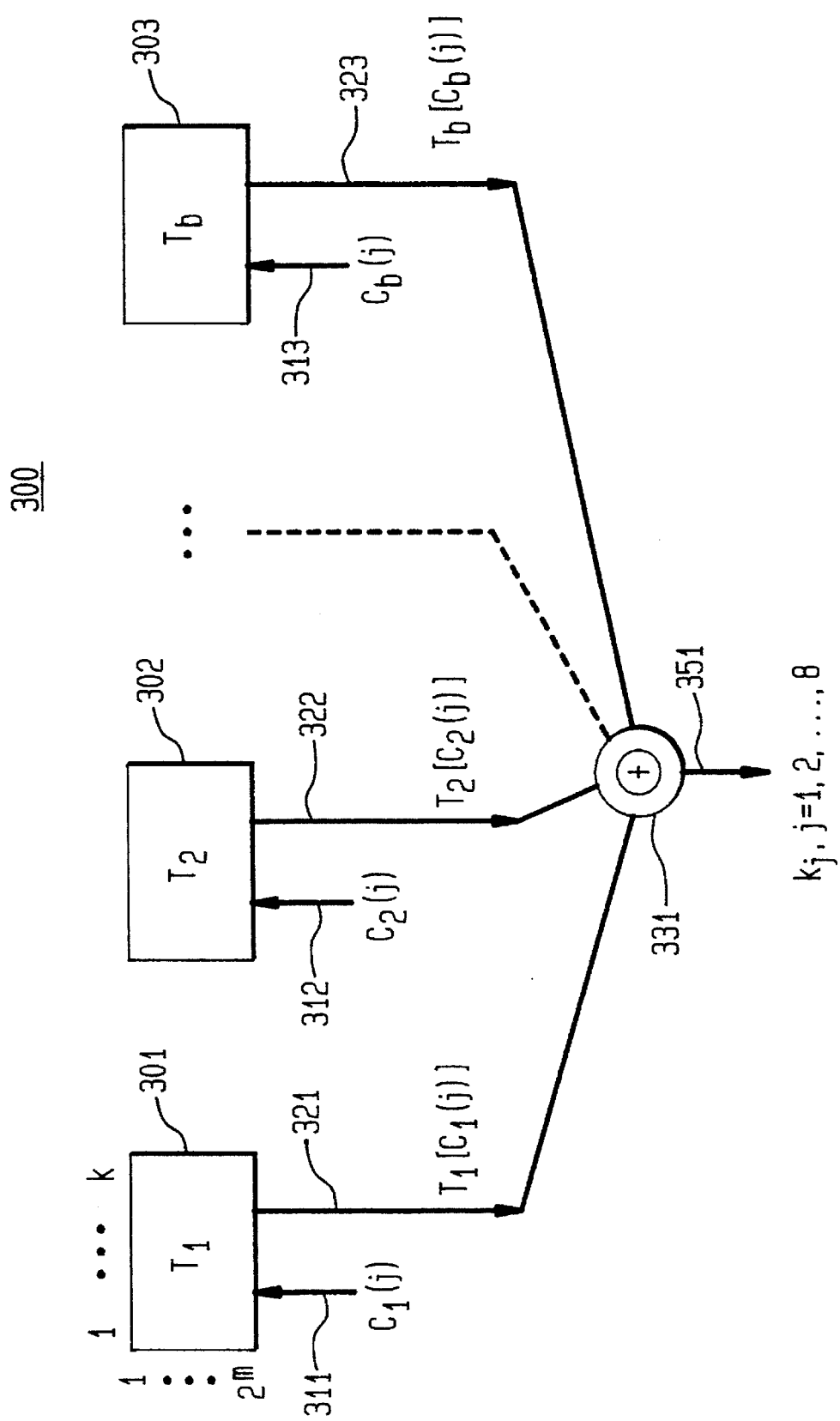
FIG. 3 is illustrative circuitry for FFSS hashing in accordance with the present invention.
Figure 5:
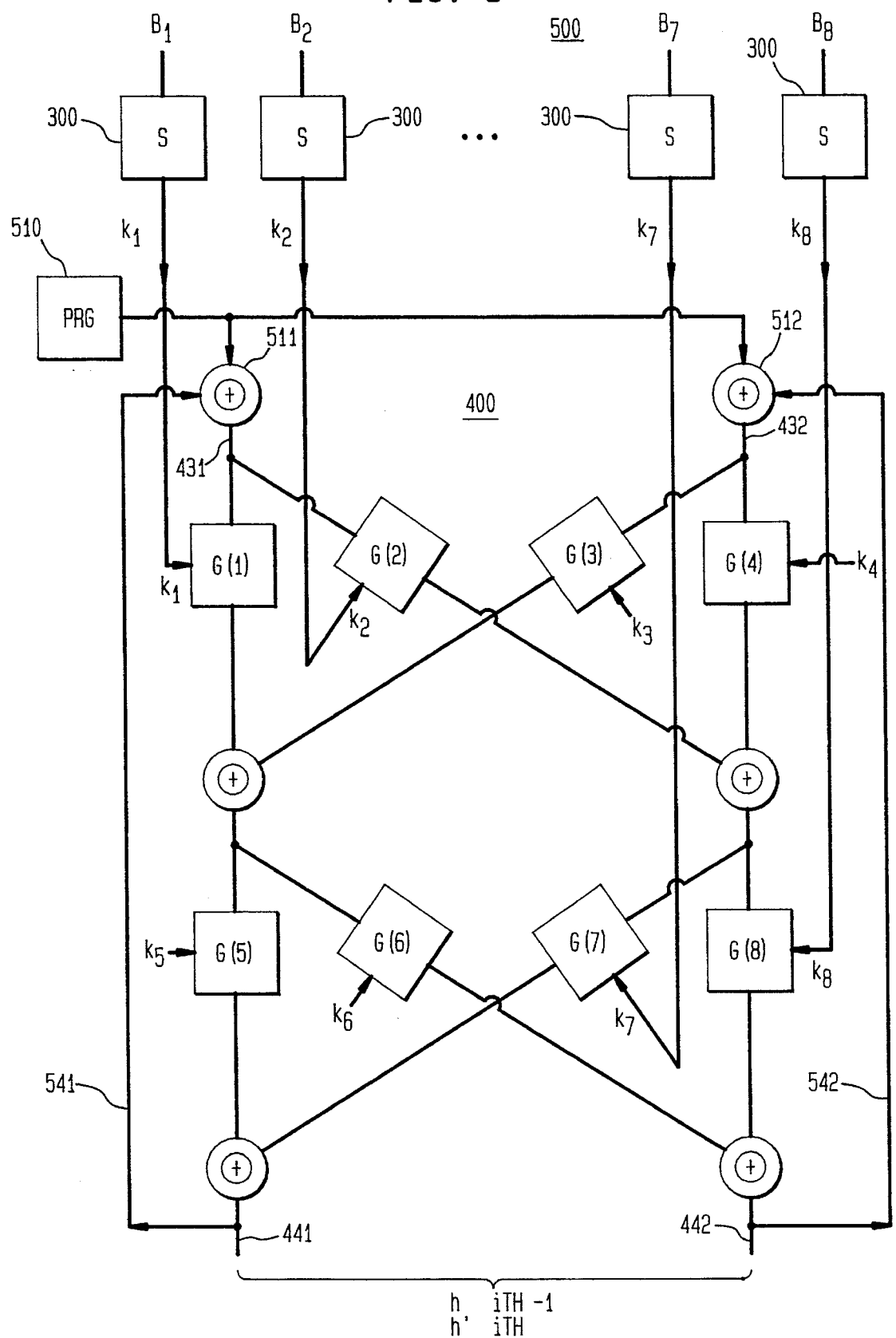
FIG. 5 depicts illustrative circuitry for efficient cryptographic hash function generation obtained by combining the circuitry of FIGS. 3 and 4.

The circuitry 500 of FIG. 5, which is illustrative of circuitry for the efficient generation of a cryptographic hash function, is obtained by combining replicated versions of the FFSS circuitry of FIG. 3 with the butterfly circuitry of FIG. 4 so as to effect equation (4). With reference to FIG. 5, there is shown an arrangement of eight FFSS generators each represented by circuitry 300 of FIG. 3; each FFSS generator 300 in FIG. 5 is shown in short-hand notation as a block labeled S, which follows from $k=S(\beta)$ as previously described. The first FFSS generator has super-block $\beta_1$ as its input, the second FFSS generator has super-block $\beta_2$ as its input, and so forth so that the eighth FFSS generator has super-block $\beta_8$ as its input. The eight outputs of the FFSS generator arrangement provide the new set of keys to the individual pseudo-random has generators G(1), G(2), . . . , G(8) of butterfly 400 shown in FIG. 5, respectively.

With circuitry 500, the hash value h' for the $i^{th}$ super-block is formed as the concatenation of the bits on buses 441 and 442; these bits are also provided on feed-back buses 541 and 542 of FIG. 5 to exclusive-OR circuits 511 and 512, respectively. The complete hash function of the input data stream is formed by processing each super-block (illustratively, $\beta_1, \beta_2, \ldots, \beta_8$) in sequence, and forming the exclusive-OR operation expressed by equation (4) iteratively, that is, as each hash value is produced. Thus, if h is the concatenation of the n bits on bus 441 and the n bits on bus 442 at the $i^{th}-1$ iteration, then h', the hash function at the $i^{th}$ iteration, is formed by: feeding back the n bits on bus 541 as a first input to exclusive-OR circuit 511 and providing the first n bits of u' (the $i^{th}$ output of PRG 510) as the second input to circuit 511; feeding back the n bits on bus 542 as a second input to exclusive-OR circuit 512 and providing the second n bits of u' as the second input to circuit 512; and providing the n bits from circuits 511 and 512 to generators 401 and 404, respectively, via buses 431 and 432, for processing by butterfly arrangement 400. Of course, for the initial iteration, the fed back outputs provided on buses 541 and 542 to exclusive-OR circuits 511 and 512 are 0's, that is, the output of circuit 511 is equal to the first n bits of u' and the output of circuit 512 is equal to the second n bits of u'.

Figure 6:
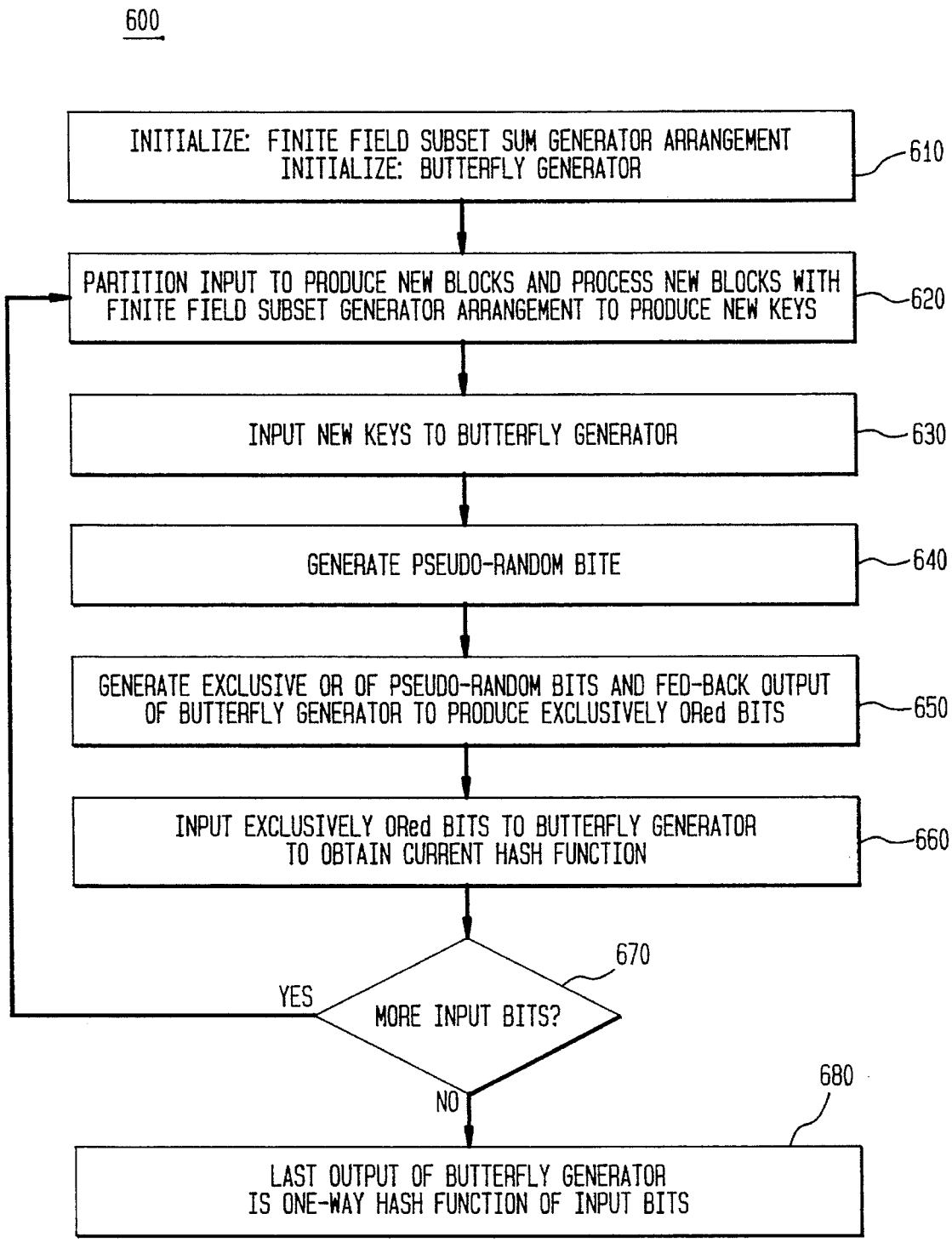
FIG. 6 is a flow diagram illustratively of the methodology of the present invention.

The flow diagram 600 of FIG. 6 is illustrative of the method effected by circuitry 500 of FIG. 5. Initially, as depicted by processing block 610, the FFSS generator arrangement obtained by replicating the FFSS generator 300 of FIG. 3, and butterfly generator 400 are initialized; thus, for instance, the tables 301, 302, . . . are filled, and the fed-back output bits on busses 541 and 542 are set to zero. Next, as depicted by processing block 620, the input bit stream is partitioned into blocks of super-blocks, and the new blocks serve as sequential inputs to the FFSS generator arrangement to produce new keys during each partitioning iteration. Then the new keys are provided to the butterfly generator, as depicted by processing block 630. Processing block 640 is invoked to generate pseudo-random bits via PRG 510. As depicted by processing block 650, the exclusive-OR of the pseudo-random bits and the fed-back output bits of the butterfly generator is formed by circuits 511 and 512; furthermore, as depicted by processing block 660, the results of the exclusive-OR serve as inputs to the butterfly generator to obtain the current hash function h', that is, the hash function at the $i^{th}$ iteration. If there are more input bits to be partitioned, as determined by processing block 670, then processing block 620 is again invoked. If the end of the input bit stream has been reached, then the last hash function generated equals the One-Way Hash Function of the input bit stream, as shown by processing block 680.

Generalizations

In illustrative embodiment 400 used to generate $B_K$, DES is the underlying pseudo-random function on n=64 bits. However, the standard key extension algorithm, which stretches the 56 bit key into a 768 bit extended key (a 48 bit sub-key for each of the 16 rounds), is not deployed, but rather and an 768 bit extended key is produced directly using the FFSS hashing function S. This improves the rate of operation by consuming a reasonable amount of data per call to DES and by avoiding the costly standard key-extension algorithm. As the extended key is not obtained from concatenating many smaller sub-keys, the "meet-in-the middle birthday attacks" on the rounds in DES are avoided. Moreover, the extended key algorithm constrains the adversary who attacks this algorithm to use as extended keys only those strings that are in the range of FFSS-hashing. But since the range of FFS is random, it will not intersect with any small set of "bad" keys (e.g., weak or semi-weak) with high probability. Finally, the attacks on DES with fully independent keys take nearly exhaustive search in terms of time.

In $B_K$, G(1) through G(4) may be replaced by universal hash functions which have the property that an output remains unpredictable even if several other outputs are known. Similar comments apply for G(5) through G(8). Just as with pseudo-random functions, to compute a universal hash function, a key is needed and this is provided in the same way as the keys for the pseudo-random functions.

The inputs to $B_K$ need not be pseudo-random. They may be a deterministically generated sequence, e.g., the sequence of integers 1, 2, 3, . . .

With respect to equation (4), it is noted that the u' bits may all be zero, in which case equation (4) reduces to a variant of block chaining.

Increasing the Hash Code Length:

Given a hash function H which has output value n bits (e.g., 128), a hash function of 2n bit outputs is obtained as follows. Instead of generating a key K using FFSS hashing, do the following. Run a strong random generator on a random seed s to get $R_1, R_2, R_3, \ldots, R_8$. From input blocks $\beta_1, \beta_2, \ldots \beta_8$ set the keys as follows: $K_1=R_1 \cdot \beta_1, K_2=R_2 \cdot \beta_2, \ldots, K_8=R_8 \cdot \beta_8$. Now define G(1), G(2), . . . , G(8) to be $H(K_1,*), H(K_2,*), \ldots, H(K_8,*)$, that is, the evaluation of the random function G(1) with key $K_1$ at an input x is replaced by that of $H(K_1,x)$ and so on. The random seed may be sent along with the hash function output if the application requires this step.

Alternately, one may modify $B_K$ so that the input data to be hashed is fed as inputs, while $K_1, \ldots, K_8$ may be replace by random numbers $R_1, \ldots, R_8$. Comments for generalizing the hash function generation apply as well for this case.

It is to be understood that the above-described embodiment is simply illustrative of the principles in accordance with the present invention. Other embodiments may be readily devised by those skilled in the art which may embody the principles in spirit and scope. Thus, it is to be further understood that the circuit arrangements described herein are not limited to the specific forms shown by way of illustration, but may assume other embodiments limited only by the scope of the appended claims.

What is claimed is:

1. A method for iteratively generating output bits corresponding to a cryptographic hash function of input bits, the method producing at each iteration a current hash function, the method utilizing a butterfly generator responsive to a set of keys, and a universal hash function generator arrangement to generate the set of keys, the method, for each iteration, comprising the steps of (a) partitioning the input bits into a new set of blocks and processing the new set of blocks with the universal hash function generator arrangement to produce a new set of keys, (b) inputing the new set of keys to the butterfly generator, (c) generating a set of bits, (d) generating the exclusive-OR of the set of bits and the fed-back output of the butterfly generator to produce a set of exclusively-ORed bits, and (e) processing the set of exclusively-ORed bits by butterfly generator, wherein the output of the butterfly generator having the set of exclusively-ORed bits as input is the current hash function, and wherein the output of the butterfly generator upon the processing of all input bits is the cryptographic hash function.

2. The method as recited in claim 1 wherein the processing by the butterfly generator generates 2n outgoing bits from 2n incoming bits partitioned into a first incoming set of n bits and a second incoming set of n bits, the butterfly generator utilizing eight n-bit pseudo-random function generators G(1), G(2), ..., G(8), each of the generators having a corresponding input key, of length k, obtained from a corresponding one of the new set of keys, the method further comprising the steps of identifying the 2n incoming bits with the exclusively-ORed bits, inputing the first incoming set to the generators G(1) and G(2), inputing the second incoming set to the generators G(3) and G(4), generating a first intermediate set of n bits as the exclusive-OR of the outputs of the generators G(1) and G(3), generating a second intermediate set of n bits as the exclusive-OR of the outputs of the generators G(2) and G(4), inputing the first intermediate set to the generators G(5) and G(6), inputing the second intermediate set to the generators G(7) and G(8), generating the first n outgoing bits as the exclusive-OR of the outputs of the generators G(5) and G(7), and generating the second n outgoing bits as the exclusive-OR of the outputs of the generators G(6) and G(8), wherein the 2n outgoing bits equate to the current hash function.

3. The method as recited in claim 1 wherein the processing by the butterfly generator generates 2n outgoing bits from 2n incoming bits partitioned into a first incoming set of n bits and a second incoming set of n bits, the butterfly generator utilizing eight n-bit universal hash function or pseudo-random function generators G(1), G(2), ..., G(8), each of the generators having a corresponding input key, of length k, obtained from a corresponding one of the new set of keys, the method further comprising the steps of identifying the 2n incoming bits with the exclusively-ORed bits, inputing the first incoming set to the generators G(1) and G(2), inputing the second incoming set to the generators G(3) and G(4), generating a first intermediate set of n bits as the exclusive-OR of the outputs of the generators G(1) and G(3), generating a second intermediate set of n bits as the exclusive-OR of the outputs of the generators G(2) and G(4), inputing the first intermediate set to the generators G(5) and G(6), inputing the second intermediate set to the generators G(7) and G(8), generating the first n outgoing bits as the exclusive-OR of the outputs of the generators G(5) and G(7), and generating the second n outgoing bits as the exclusive-OR of the outputs of the generators G(6) and G(8), wherein the 2n outgoing bits equate to the current hash function.

4. The method as recited in claim 1 wherein the universal hash function generator arrangement is a finite field subset-sum generator arrangement and wherein the step of processing by the universal hash function generator arrangement includes the step of processing by the finite field subset-sum generator arrangement to generate the set of keys identified by $k_1, k_2, \ldots, k_8$, each of length k, the finite field subset-sum generator arrangement being composed of a eight finite field subset-sum generators, each of the generators utilizing b random bit tables $T_1, T_2, \ldots, T_b$, with each table having $2^m$ rows and k columns, and wherein the step of partitioning includes the step of partitioning the input bits into eight blocks of 8mb bits to produce the new blocks, the eight blocks being designated $\beta_1, \beta_2, \ldots, \beta_8$, with each of the blocks having b m-bit groups $c_i(j)$ such that $\{c_1(1), c_2(1), \ldots, c_b(1)\}$ corresponds to $\beta_1$, $\{c_1(2), c_2(2), \ldots, c_b(2)\}$ corresponds to $\beta_1, \ldots$, and $\{c_1(8), c_2(8), \ldots, c_b(8)\}$ corresponds to $\beta_8$, and wherein the step of processing by the universal hash function generator arrangement includes the steps, for each j, j=1,2, ...,8, of selecting a row from each table $T_i$ in correspondence to each group $c_i(j)$, i=1, 2, ..., b, and of evaluating the bitwise exclusive-OR of said b selected rows to generate the corresponding key $k_j$.

5. A method for iteratively generating output bits corresponding to a cryptographic bash function of input bits, the method producing at each iteration a current hash function, the method utilizing a butterfly generator responsive to a set of keys, and a universal hash function generator arrangement to generate the set of keys, the method comprising the steps of (a) partitioning the input bits into a new set of blocks and processing the new set of blocks with the universal hash function generator arrangement to produce a new set of keys, (b) inputing the new set of keys to the butterfly generator, (c) generating a set of bits, (d) generating the exclusive-OR of the set of bits and the fed-back output of the butterfly generator to produce a set of exclusively-ORed bits, and (e) processing the set of exchsively-ORed bits by butterfly generator, and (f) if more input bits remain to be partitioned, returning to step (a);

otherwise, equating the cryptographic hash function of the input bits to the current hash function.

6. The method as recited in claim 5 wherein the processing by the butterfly generator generates 2n outgoing bits from 2n incoming bits partitioned into a first incoming set of n bits and a second incoming set of n bits, the butterfly generator utilizing eight n-bit pseudo-random function generators G(1), G(2), ..., G(8), each of the generators having a corresponding input key, of length k, obtained from a corresponding one of the new set of keys, the method further comprising the steps of identifying the 2n incoming bits with the exclusively-ORed bits, inputing the first incoming set to the generators G(1) and G(2), inputing the second incoming set to the generators G(3) and G(4), generating a first intermediate set of n bits as the exclusive-OR of the outputs of the generators G(1) and G(3), generating a second intermediate set of n bits as the exclusive-OR of the outputs of the generators G(2) and G(4), inputing the first intermediate set to the generators G(5) and G(6), inputing the second intermediate set to the generators G(7) and G(8), generating the first n outgoing bits as the exclusive-OR of the outputs of the generators 0(5) and G(7), and generating the second n outgoing bits as the exclusive-OR of the outputs of the generators G(6)and G(8), wherein the 2n outgoing bits equate to the current hash function.

7. The method as recited in claim 5 wherein the processing by the butterfly generator generates 2n outgoing bits from 2n incoming bits partitioned into a first incoming set of n bits and a second incoming set of n bits, the butterfly generator utilizing eight n-bit universal hash function or pseudo-random function generators $G(1), G(2), \ldots, G(8)$, each of the generators having a corresponding input key, of length k, obtained from a corresponding one of the new set of keys, the method further comprising the steps of identifying the 2n incoming bits with the exclusively-ORed bits, inputing the first incoming set to the generators $G(1)$ and $G(2)$, inputing the second incoming set to the generators $G(3)$ and $G(4)$, generating a first intermediate set of n bits as the exclusive-OR of the outputs of the generators $G(1)$ and $G(3)$, generating a second intermediate set of n bits as the exclusive-OR of the outputs of the generators $G(2)$ and $G(4)$, inputing the first intermediate set to the generators $G(5)$ and $G(6)$, inputing the second intermediate set to the generators $G(7)$ and $G(8)$, generating the first n outgoing bits as the exclusive-OR of the outputs of the generators $G(5)$ and $C(7)$, and generating the second n outgoing bits as the exclusive-OR of the outputs of the generators $C(6)$ and $C(8)$, wherein the 2n outgoing bits equate to the current hash function.

8. The method as recited in claim 5 wherein the universal hash function generator arrangement is a finite field subset-sum generator arrangement and wherein the step of processing by the universal hash function generator arrangement includes the step of processing by the finite field subset sum generator arrangement to generate the set of keys identified by $k_1, k_2, \ldots, k_8$, each of length k, the finite field subset-sum generator arrangement being composed of a eight finite field subset-sum generators, each of the generators utilizing b random bit tables $T_1, T_2, \ldots, T_b$ with each table having $2^m$ rows and k columns, and wherein the step of partitioning includes the step of partitioning the input bits into eight blocks of 8mb bits to produce the new blocks, the eight blocks being designated $\beta_1, \beta_2, \ldots, \beta_8$, with each of the blocks having b m-bit groups $c_i(j)$ such that $\{c_1(1), c_2(1), \ldots, c_b(1)\}$ corresponds to $\beta_1$, $\{c_1(2), c_2(2), \ldots, c_b(2)\}$ corresponds to $\beta_1, \ldots,$ and $\{c_1(8), c_2(8), \ldots, c_b(8)\}$ corresponds to $\beta_8$, and wherein the step of processing by the universal hash function generator arrangement includes the steps, for each j, $j=1,2,\ldots,8$, of selecting a row from each table $T_i$ in correspondence to each group $c_i(j)$, $i=1, 2, \ldots, b$, and of evaluating the bitwise exclusive-OR of said b selected rows to generate the corresponding key $k_j$.

9. A method for generating output bits corresponding to a cryptographic hash function of input bits, the method utilizing eight n-bit pseudo-random function generators $G(1), G(2), \ldots, G(8)$, each of the generators having a corresponding input key $k_1, k_2, \ldots, k_8$ of length k, the method further utilizing b random bit tables $T_1, T_2, \ldots, T_b$ with each table having $2^m$ rows and k columns, the method comprising the steps of (a) partitioning the initial 8mb bits of the input bits into eight blocks, designated $\beta_1, \beta_2, \ldots, \beta_8$, with each of the blocks having b m-bit groups $c_i(j)$ as the current input groups such that $\{c_1(1), c_2(1), \ldots, c_b(1)\}$ corresponds to $\beta_1$, $\{c_1(2), c_2(2), \ldots, c_b(2)\}$ corresponds to $\beta_1, \ldots,$ and $\{c_1(8), c_2(8), \ldots, c_b(8)\}$ corresponds to $\beta_8$, and proceeding to step (c), (b) partitioning the next 8mb bits of the input bits into eight blocks, designated $\beta_1, \beta_2, \ldots, \beta_8$, with each of the blocks having b m-bit groups $c_i(j)$ as the current input groups wherein $\{c_1(1), c_2(1), \ldots, c_b(1)\}$ corresponds to $\beta_1$, $\{c_1(2), c_2(2), \ldots, c_b(2)\}$ corresponds to $\beta_1, \ldots,$ and $\{c_1(8), c_2(8), \ldots, c_b(8)\}$ corresponds to $\beta_8$, (c) for each j, $j=1,2,\ldots,8$, selecting a row from each table $T_i$ in correspondence to each current group $c_i(j)$, $i=1, 2, \ldots, b$, and evaluating the bitwise exclusive-OR of said b selected rows to generate a corresponding key $k_j$, (d) generating 2n pseudorandom bits partitioned into a first pseudo-random set of n bits and a second pseudo-random set of n bits, (e) inputing the first pseudo-random set and the respective keys $k_1$ and $k_2$ to the generators $G(1)$ and $G(2)$, (f) inputing the second pseudo-random set and the respective keys $k_3$ and $k_4$ to the generators $G(3)$ and $G(4)$, (g) generating a first intermediate set of n bits as the bitwise exclusive-OR of the outputs of the generators $G(1)$ and $G(3)$, (h) generating a second intermediate set of n bits as the bitwise exclusive-OR of the outputs of the generators $G(2)$ and $G(4)$, (i) inputing the first intermediate set and the respective keys $k_5$ and $k_6$ to (j) inputing the second intermediate set and the respective keys $k_7$ and $k_8$ (k) generating the first n bits of the current output bits as the bitwise exclusive-OR of the outputs of the generators $G(5)$ and $G(7)$, (l) generating the second n bits of the current output bits as the bitwise exclusive-OR of the outputs of the generators $G(6)$ and $G(8)$, (m) forming the output bits corresponding to the cryptographic hash function as the bitwise exclusive-OR of the current output bits generated sequentially by steps (k) and (l), and (n) returning to step (b) if more input bits can be partitioned.

10. A method for generating 2n output bits from 2n input bits partitioned into a first input set of n bits and a second input set of n bits, the method utilizing eight n-bit pseudo-random function generators $G(1), G(2), \ldots, G(8)$, each of the generators having a corresponding input key of length k, the method comprising the steps of inputing the first input set to the generators $G(1)$ and $G(2)$, inputing the second input set to the generators $G(3)$ and $G(4)$, generating a first intermediate set of n bits as the exclusive-OR of the outputs of the generators $G(1)$ and $G(3)$, generating a second intermediate set of n bits as the exclusive-OR of the outputs of the generators $G(2)$ and $G(4)$, inputing the first intermediate set to the generators $G(5)$ and $G(6)$, inputing the second intermediate set to the generators $G(7)$ and $G(8)$, generating the first n output bits as the exclusive-OR of the outputs of the generators $G(5)$ and $G(7)$, and generating the second n output bits as the exclusive-OR of the outputs of the generators G(6) and G(8).

11. A method for generating 2n output bits from 2n input bits partitioned into a first input set of n bits and a second input set of n bits, the method utilizing eight n-bit universal hash function or pseudo-random function generators G(1), G(2), ..., G(8), each of the generators having a corresponding input key of length k, the method comprising the steps of inputing the first input set to the generators G(1) and G(2), inputing the second input set to the generators G(3) and G(4), generating a first intermediate set of n bits as the exclusive-OR of the outputs of the generators G(1) and G(3), generating a second intermediate set of n bits as the exclusive-OR of the outputs of the generators G(2) and G(4), inputing the first intermediate set to the generators G(5) and G(6), inputing the second intermediate set to the generators G(7) and G(8), generating the first n output bits as the exclusive-OR of the outputs of the generators G(5) and G(7), and generating the second n output bits as the exclusive-OR of the outputs of the generators G(6) and G(8).

12. A method for generating a key of length k from mb input bits, the method defining a finite field subset-sum generator, the method comprising the steps of generating b random bit tables $T_1, T_2, \ldots, T_b$ with each table having $2^m$ rows and k columns, arranging the mb input bits as b m-bit groups designated $c_i$, i=1, 2, ..., b, selecting a row from each table $T_i$ in correspondence to each group $c_i$, i=1, 2, ..., b, and evaluating the bitwise exclusive-OR of said b selected rows to generate the key.

13. Circuitry for generating output bits corresponding to a cryptographic hash function of input bits, the circuitry utilizing eight n-bit pseudo-random function generators G(1), G(2), ..., G(8), each of the generators having a corresponding input key $k_1, k_2, \ldots, k_8$ of length k, the circuitry further utilizing b random bit tables $T_1, T_2, \ldots, T_b$ with each table having $2^m$ rows and k columns, the circuitry comprising (a) means, responsive to the input bits, for partitioning the initial 8mb bits of the input bits into eight blocks, designated $\beta_1, \beta_2, \ldots, \beta_8$, with each of the blocks having b m-bit groups $c_i(j)$ as the current input groups such that $\{c_1(1), c_2(1), \ldots, c_b(1)\}$ corresponds to $\beta_1$, $\{c_1(2), c_2(2), \ldots, c_b(2)\}$ corresponds to $\beta_1, \ldots$, and $\{c_1(8), c_2(8), \ldots, c_b(8)\}$ corresponds to $\beta_8$, and proceeding to step (c), (b) means, responsive to the input bits, for partitioning the next 8mb bits of the input bits into eight blocks, designated $\beta_1, \beta_2, \ldots, \beta_8$, with each of the blocks having b m-bit groups $c_i(j)$ as the current input groups wherein $\{c_1(1), c_2(1), \ldots, c_b(1)\}$ corresponds to $\beta_1$, $\{c_1(2), c_2(2), \ldots, c_b(2)\}$ corresponds to $\beta_1, \ldots$, and $\{c_1(8), c_2(8), \ldots, c_b(8)\}$ corresponds to $\beta_8$, (c) means, responsive to each means for partitioning for selecting for each j, j=1,2,...,8, a row from each table $T_i$ in correspondence to each current group $c_i(j)$, i=1, 2, ..., b, and for evaluating the bitwise exclusive-OR of said b selected rows to generate a corresponding key $k_j$, (d) means, responsive to the means for generating and for evaluating, for generating 2n pseudo-random bits partitioned into a first pseudo-random set of n bits and a second pseudo-random set of n bits, (e) means for inputing the first pseudo-random set and the respective keys $k_1$ and $k_2$ to the generators G(1) and G(2), (f) means for inputing the second pseudo-random set and the respective keys $k_3$ and $k_4$ to the generators G(3) and G(4).

(g) means for generating a first intermediate set of n bits as the bitwise exclusive-OR of the outputs of the generators G(1) and G(3), (h) means for generating a second intermediate set of n bits as the bitwise exclusive-OR of the outputs of the generators G(2) and G(4), (i) means for inputing the first intermediate set and the respective keys $k_5$ and $k_6$ to the generators C(5) and C(6), (j) means for inputing the second intermediate set and the respective keys $k_7$ and $k_8$ to the generators G(7) and G(8), (k) means for generating the first n bits of the current output bits as the bitwise exclusive-OR of the outputs of the generators G(5) and G(7), (l) means for generating the second n bits of the current output bits as the bitwise exclusive-OR of the outputs of the generators G(6) and G(8), (m) means for forming the output bits corresponding to the hash function as the bitwise exclusive-OR of the current output bits generated sequentially by steps (k) and (l), and (n) means for returning to step (b) if more input bits can be partitioned.

* * * * *